S. C. ROWLAND.
BUMPER FOR MOTOR VEHICLES.
APPLICATION FILED AUG 21, 1920.
1,373,024.
Patented Mar. 29, 1921.
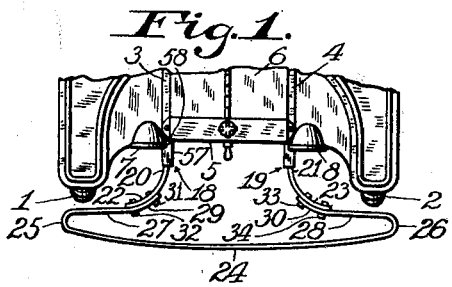
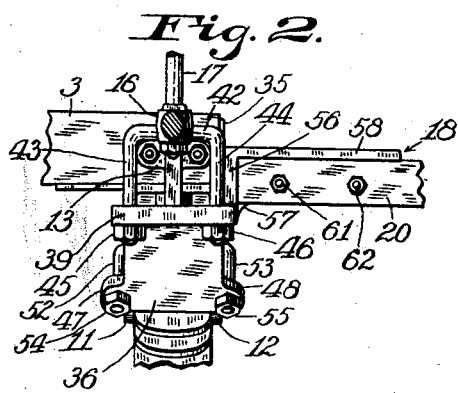
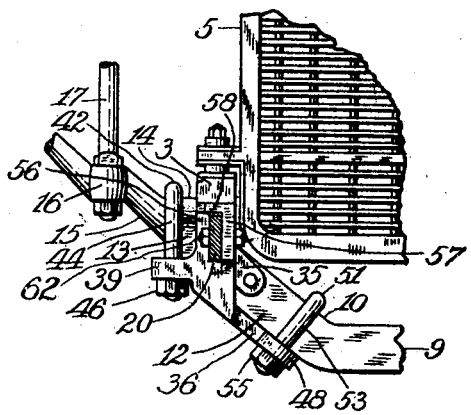
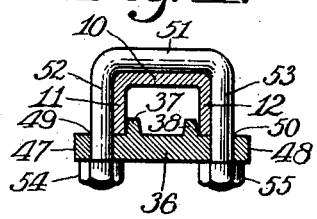
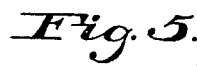
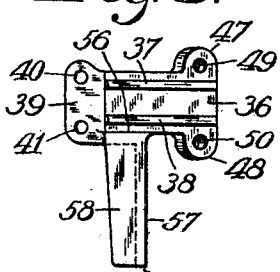
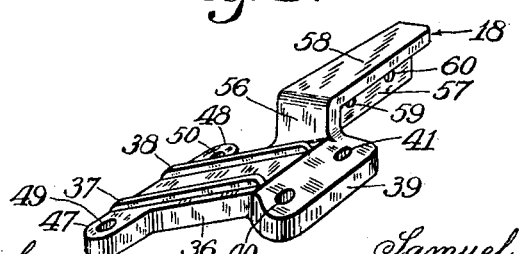
WITNESS:
Robert Liebrich
R. H. Sample
INVENTOR:
Samuel C. Rowland,
BY
E. T. Silvius,
ATTORNEY.

UNITED STATES PATENT OFFICE.

SAMUEL C. ROWLAND, OF CRAWFORDSVILLE, INDIANA.

BUMPER FOR MOTOR-VEHICLES.

1,373,024. Specification of Letters Patent. Patented Mar. 29, 1921.

Application filed August 21, 1920. Serial No. 405,119.

*To all whom it may concern:*

Be it known that I, SAMUEL C. ROWLAND, a citizen of the United States, residing at Crawfordsville, in the county of Montgomery and State of Indiana, have invented a new and useful Bumper for Motor-Vehicles, of which the following is a specification, reference being had to the accompanying drawings and to the letters and figures of reference marked thereon.

This invention relates to the type of bumper that is designed to be used on the forward and rearward ends of motor vehicles to protect them from injury in case of collision with another vehicle or obstacle, the invention having reference more particularly to a bumper that is designed to be applied to various motor vehicles already delivered from the factory, and especially to motor vehicles commonly known as "Fords."

An object of the invention is to provide a bumper for motor vehicles which shall be so constructed as to be adapted to be firmly secured to a motor vehicle and to operate reliably and efficiently to absorb shocks, while being of simple form and not costly to the manufacturer.

Another object is to provide a bumper of improved construction which shall have parts adapted to be readily replaced after destructive accidents and by the owner at small cost without requiring the use of special tools.

A further object is to provide an improved bumper for automobiles of the "Ford" type which shall be composed of a number of parts and adapted to be shipped from the factory in knock-down condition and in compact arrangement to be connected together by the purchaser, and which will be durable and economical in use.

A still further and more specific object is to provide a bumper of the above-mentioned character which shall have improved base members of such construction as to be adapted to constitute end extensions of the side bars of an automobile frame, and which shall be adapted to be readily secured in place and capable of transmitting the force of shocks directly to the ends of the frame bars in alinement therewith, so that the frame bars shall directly resist the force of severe shocks.

With the above-mentioned and other objects in view, the invention consists in an improved bumper having novel features, more particularly relating to the base members thereof whereby the bumper is secured to a motor vehicle frame, the invention consisting also further in the parts and combinations and arrangements of parts as hereinafter particularly described and further defined in the accompanying claims.

Referring to the drawings, Figure 1 is a top plan of the improved bumper mounted on the forward end of a motor vehicle, a top plan of the forward portion only of the motor vehicle being shown as sufficient to illustrate the arrangement and purpose of the invention; Fig. 2 is a fragmentary side elevation showing on an enlarged scale a portion of one of the frame bars of the motor vehicle to which the invention is applied; Fig. 3 is a fragmentary front elevation of the motor vehicle also on an enlarged scale to which the invention is applied, the forward portion of the bumper being broken away; Fig. 4 is a transverse section of the forward transverse beam of the automobile frame and the base member of the bumper connected thereto; Fig. 5 is a top plan of one of the base members minus its fasteners, and Fig. 6 is a perspective view of one of the two base members of the bumper.

Similar reference characters in the different figures of the drawings indicate corresponding elements or features of the invention and construction herein referred to in detail.

In the drawings the numerals 1 and 2 indicate the forward wheels of the motor vehicle, 3 and 4 indicate the forward portions of the side bars of the motor vehicle frame. 5 indicates the cooling system radiator and 6 the engine hood, the motor vehicle having headlights 7 and 8. The motor vehicle frame has a transverse beam which has a horizontal portion 9 and inclined portions 10 that are suitably secured to the side bars 3 and 4, being of familiar form, the horizontal portion of the beam being supported upon a leaf spring, as is well-known, and the beam is composed of a channel section of iron or steel, so that each inclined portion has downwardly extending wings or flanges 11 and 12. Suitable brackets are secured to the outer side of the frame bars 3 and 4 and, as is well-known, each bracket has a base portion 13 secured against the outer side of the frame bar and having a nearly horizontal top 14, the base portion having an upwardly extending arm 15 provided with a boss 16 which supports a lamp post 17, the base portion of the bracket being adjacent to the upper portion of the transverse beam.

In carrying out the objects of the invention, frame bar extensions, indicated generally by the numerals 18 and 19, are provided and suitably connected therewith and constitute base members of the bumper. The remaining portions of the bumper are composed principally of flat bar steel and bent to the required shapes. The bumper comprises two arms having straight portions 20 and 21 that are secured to the extensions of the side bars, and outwardly curved splice portions 22 and 23 extending from the straight portions respectively. The bumper has also a bow-shaped main bar 24 having crooks 25 and 26 on opposite ends respectively thereof and from which extend return members 27 and 28 respectively having curved splice portions 29 and 30 extending therefrom respectively which are arranged against the convex sides of the curved splice portions 22 and 23 respectively, and the curved splice portion 29 is secured to the curved splice portion 22 by means of bolts 31 and 32, the curved splice portion 30 being secured to the curved splice portion 23 by means of bolts 33 and 34. The return portions 27 and 28 are arranged forward of the wheels 1 and 2 and are usually prevented from being forced back to the wheels by those curved splice portions which are bolted together to afford stiff arm portions.

In some cases the forward end of the longitudinal frame bars 3 and 4 have end plates or corner pieces 35 which are secured to the forward side of the transverse beam, and in such cases practically constitute end plates of the frame bars 3 and 4.

The base members of the bumper or frame side bar extensions are made in pairs, right and left, and, the detail description of the right hand member will be sufficient to an understanding of both. The frame bar extension has a base plate 36 which is arranged in an inclined position against the edges of the wings 11 and 12 and it has ribs 37 and 38 thereon that are slightly beveled so as to fit closely between the wings and assist in steadying the extension. The base plate 36 has a horizontal extension 39 on its upper end which is provided with bolt holes 40 and 41, the extension 39 being arranged under the bracket base 13 and secured to the bracket brace by a suitable clamp comprising preferably a cross bar or loop 42 seated upon the top 14 of the bracket base and bolt members 43 and 44 extending through the bolt holes and provided with nuts 45 and 46. Thus the extension 39 is beyond the vertical plane of the outside of the frame bar 3 and is directly supported in a simple manner by the bracket base 13. The lower portion of the plate 36 has lateral ears 47 and 48 thereon which have bolt holes 49 and 50 respectively, whereby the plate is securely clamped to the inclined portion of the transverse frame beam, preferably by means of a yoke comprising a cross bar 51 arranged on the inclined portion 10 and bolt members 52 and 53 extending through the bolt holes and provided with nuts 54 and 55 seated on the under side of the ears. The inclined base plate 36 has an abutment or shoulder 56 on the forward edge portion adjacent to the upper end thereof and adjacent to the extension 39, so as to be seated against the forward end of the longitudinal side frame bar, and the abutment has an angle arm member extending forward therefrom and comprising a vertical wing 57 and a horizontal wing 58, the vertical wing having bolt holes 59 and 60 therein to receive bolts 61 and 62 whereby the straight portion 20 of the bumper arm is secured to the vertical wing beneath the horizontal wing and against the forward side of the abutment 56, so that the straight portion 20 of the arm shall be in alinement with the frame bar 3 and enable the frame bar to directly resist the thrust of the bumper arm.

In practical use the main bar 24 of the bumper may be forced into contact with the wheels or with the bumper of another motor vehicle, or with a wall or other obstacle, and the shock will be absorbed by the elasticity of the different portions of the bumper, the base members of which are firmly secured in place and keyed by means of the ribs 37 and 38 on the base plate 36, severe shocks being effectually resisted by the longitudinal side bars and indirectly by the whole motor vehicle frame. In case of breakage resulting from destructive accidents a fractured part of the bumper may be readily unbolted and replaced by a new part.

Having thus described the invention, what is claimed as new is—

1. A motor-vehicle bumper base member comprising a base plate to be supported in inclined position, an abutment on one edge portion of the base plate and projecting beyond the plane of the top face of the plate at an approximately right angle thereto, and an arm having a wing extending from the front side and a wing extending from the top portion of the abutment.

2. A motor-vehicle bumper having base members comprising each a base plate having a relatively angular extension on one end and two ears adjacent to the opposite end thereof, the top of the base plate having two key-ribs thereon extending approximately to the extension, an abutment on one edge portion of the base plate adjacent to the base plate extension and an arm comprising relatively angular wings extending from the abutment.

3. A motor-vehicle bumper including two base members having each an abutment and an arm extending from the abutment, each abutment being provided with a base plate, two arm members having each a straight portion and an outwardly-curved portion provided with bolts, the straight portions being secured to the arms of the abutments respectively, a yielding main bar having crooks on its ends respectively, each crook having a nearly straight return portion provided with a curved portion connected to the bolts of the curved portions of the arm members, and clamps connected with the base plate.

4. A motor-vehicle bumper including a bow-shaped yielding main bar, two crooks on the ends respectively of the main bar and extending opposite to the back thereof, two nearly straight return members extending from the crooks respectively and rearwardly divergently relatively to the bar, the return members having curved splice portions extending in the direction away from the main bar, each splice portion being provided with two bolts, two arm parts having curved splice portions connected each with the bolts of the first-mentioned splice portions, the arm parts having straight portions respectively, and two base members secured to the straight portions of the arm parts respectively.

5. A motor-vehicle bumper base member comprising a base plate to be supported in inclined position and having two longitudinal key-ribs on the upper side and also a relatively angular extension on the upper end thereof, the extension having clamp-bolt holes therein, the lower portion of the base plate being provided with clamp-bolt holes beyond the ribs respectively, an abutment on one edge portion of the base plate adjacent to its upper end and also to the angular extension and extending upward beyond the plane of the top face of the plate at an approximately right angle thereto, and an arm extending from the front side of the abutment and having bolt holes therein.

6. In a motor-vehicle bumper, the combination with the longitudinal side bars of the motor-vehicle, and a bumper having supporting arms, of a pair of base members comprising broad abutments arranged against the ends of the side bars respectively, and arm members on the fronts of the abutments respectively and extending in alinement with the side bars respectively to constitute extensions thereof, the arm members carrying the supporting arms respectively of the bumper, and the abutments having base plates and means securing them firmly to the side bars respectively.

In testimony whereof, I affix my signature in presence of two witnesses.

SAMUEL C. ROWLAND.

Witnesses:
E. T. SILVIUS,
R. H. SAMPLE.